United States Patent
Zhi et al.

(10) Patent No.: US 9,683,849 B2
(45) Date of Patent: Jun. 20, 2017

(54) VEHICLE NAVIGATION SYSTEM WITH ADAPTIVE GYROSCOPE BIAS COMPENSATION

(71) Applicant: Trimble Navigation Limited, Sunnyvale, CA (US)

(72) Inventors: Xiaorong Zhi, Fremont, CA (US); Takayuki Hoshizaki, Cupertino, CA (US); Peter Van Wyck Loomis, Sunnyvale, CA (US); Walter Kenneth Stockwell, Campbell, CA (US)

(73) Assignee: Trimble Inc., Sunnyvale, CA (US)

( * ) Notice: Subject to any disclaimer, the term of this patent is extended or adjusted under 35 U.S.C. 154(b) by 54 days.

(21) Appl. No.: 14/676,595

(22) Filed: Apr. 1, 2015

(65) Prior Publication Data

US 2016/0290810 A1 Oct. 6, 2016

(51) Int. Cl.
*G01C 21/18* (2006.01)
*G01C 21/16* (2006.01)
*G01C 25/00* (2006.01)
*G01C 19/56* (2012.01)
*G01C 21/20* (2006.01)
*G01S 19/52* (2010.01)

(52) U.S. Cl.
CPC ............ *G01C 21/18* (2013.01); *G01C 19/56* (2013.01); *G01C 21/165* (2013.01); *G01C 21/20* (2013.01); *G01C 25/005* (2013.01); *G01S 19/52* (2013.01)

(58) Field of Classification Search
CPC ........ G01C 25/00; G01C 19/42; G01C 21/16; G01C 21/165
See application file for complete search history.

(56) References Cited

U.S. PATENT DOCUMENTS

| | | | |
|---|---|---|---|
| 5,527,003 A * | 6/1996 | Diesel | G05D 1/101 244/195 |
| 6,577,952 B2 | 6/2003 | Geier | |
| 7,549,334 B2 | 6/2009 | Cardarelli | |
| 7,920,981 B2 | 4/2011 | Fennel | |
| 8,229,166 B2 | 7/2012 | Teng | |
| 8,397,568 B2 | 3/2013 | Cardarelli | |
| 8,406,996 B2 | 3/2013 | Loomis | |
| 8,583,371 B1 * | 11/2013 | Goodzeit | G01C 19/5776 701/501 |
| 8,855,917 B2 | 10/2014 | Koenig | |
| 2003/0036847 A1 * | 2/2003 | Geier | G01C 21/165 701/472 |
| 2003/0083814 A1 * | 5/2003 | Gronemeyer | G01S 19/23 701/478 |

(Continued)

FOREIGN PATENT DOCUMENTS

KR 20100010062 A * 1/2010

OTHER PUBLICATIONS

Harvey Weinberg, "Analog Devices Technical Article MS-2158 Gyro Mechanical Performance: The Most Important Parameter", Analog Devices, Norwood, MA, Sep. 2011.

(Continued)

*Primary Examiner* — Redhwan k Mawari
(74) *Attorney, Agent, or Firm* — Kilpatrick Townsend & Stockton LLP

(57) ABSTRACT

Adaptive gyroscope bias compensation allows a vehicle navigation module to estimate position and velocity reliably during temperature changes.

20 Claims, 9 Drawing Sheets

(56) References Cited

U.S. PATENT DOCUMENTS

| | | | |
|---|---|---|---|
| 2008/0022790 A1* | 1/2008 | Lee | G01C 19/42 74/5.4 |
| 2008/0228329 A1* | 9/2008 | Hartman | B60T 8/172 701/1 |
| 2009/0099774 A1* | 4/2009 | Takac | A01B 79/005 701/472 |
| 2009/0217539 A1* | 9/2009 | Blake | G01V 1/46 33/302 |
| 2009/0222204 A1* | 9/2009 | Roberts | G05D 1/0259 701/470 |
| 2009/0248346 A1* | 10/2009 | Fennel | B60T 8/885 702/96 |
| 2009/0251558 A1* | 10/2009 | Park | H04N 5/23241 348/222.1 |
| 2010/0208057 A1* | 8/2010 | Meier | G06T 7/0046 348/135 |
| 2010/0292943 A1* | 11/2010 | Minor | G01C 21/16 702/64 |
| 2014/0260517 A1* | 9/2014 | Demerly | G01P 21/00 73/1.38 |

OTHER PUBLICATIONS

Huiliang Cao, et al., "A Novel Temperature Compensation Method for a MEMS Gyroscope Oriented on a Periphery Circuit", Int. J. Adv. Robotic Sys., v. 10, p. 327, 2013.

Vasiliy M. Tereshkov, "An Intuitive Approach to Inertial Sensor Bias Estimation", arXiv:1212.0892v3 [cs:SY], Jul. 2013.

Igor P. Prikhodko, et al., "Compensation of drifts in high-Q MEMS gyroscopes using temperature self-sensing", Sens. Actuators A: Phys. (2013), http://dx.doi.org/10.1016/j.sna.2012.12.024, 2013.

Dunzhu Xia, et al., "Microgyroscope Temperature Effects and Compensation-Control Methods", Sensors 2009, 9, 8349-8376; doi:10.3390/s91008349, 2009.

Ballard, et al., "Rigid Body Motion from Depth and Optical Flow", Computer Vision, Graphics, and Image Processing, 22, 95-115, (1983).

* cited by examiner

VEHICLE NAVIGATION SYSTEM WITH ADAPTIVE GYROSCOPE BIAS COMPENSATION

TECHNICAL FIELD

The disclosure is related to vehicle navigation systems.

BACKGROUND

Vehicle navigation systems are found in an ever increasing proportion of new cars and light trucks. The primary source of position, velocity and time data in a typical vehicle navigation system is a global navigational satellite system (GNSS) receiver. (The United States' NAVSTAR Global Positioning System (GPS) is the most widely used GNSS; however, modern GNSS receivers may use signals from GPS and other GNSSs such as the Russian GLONASS, Chinese BeiDou and European Galileo systems.)

The accuracy of GNSS receivers suffers if a clear view of several satellites is not available. GNSS receivers can have difficulty in urban canyons, parking garages, tunnels, bridge lower decks or dense forests, as examples. Dead reckoning, meaning estimating position based on heading and distance traveled since the last GNSS position fix, is a way to fill in gaps in GNSS coverage. Dead reckoning is based on data obtained from sensors such as accelerometers, gyroscopes and odometers.

Gyroscopes used in vehicle navigation systems are inexpensive micro-electromechanical systems (MEMS). In 2015 a MEMS gyroscope cost only about $1. As in many things, you get what you pay for, and low-cost MEMS gyroscopes, while being an essential component of dead reckoning systems, have severe limitations. In particular, low-cost MEMS gyroscopes are not supplied with unit-specific characterization data or precise self-calibration mechanisms. A hundred gyros, all of the same type, may all produce different readings under identical operating conditions. Left uncorrected, these variations can lead to navigation errors.

Therefore, what are needed are systems and methods to track and estimate errors in low-cost MEMS gyroscopes found in vehicle navigation systems.

DETAILED DESCRIPTION

Advanced car navigation modules use both GNSS and dead reckoning (DR). DR fills in the gaps when GNSS accuracy is degraded or GNSS is not available. As an example, when a car travels through a mountain tunnel its GNSS receiver is blocked from receiving satellite signals and a navigation module cannot compute GNSS-based position or velocity. Instead, inertial and other sensors supply data from which position and velocity may be estimated. For example, a yaw gyro may keep track of heading changes while an odometer records how far the car travels. In dead reckoning mode, therefore, one factor that affects navigation accuracy is the accuracy of heading estimates based on yaw gyro data.

Figure 1:
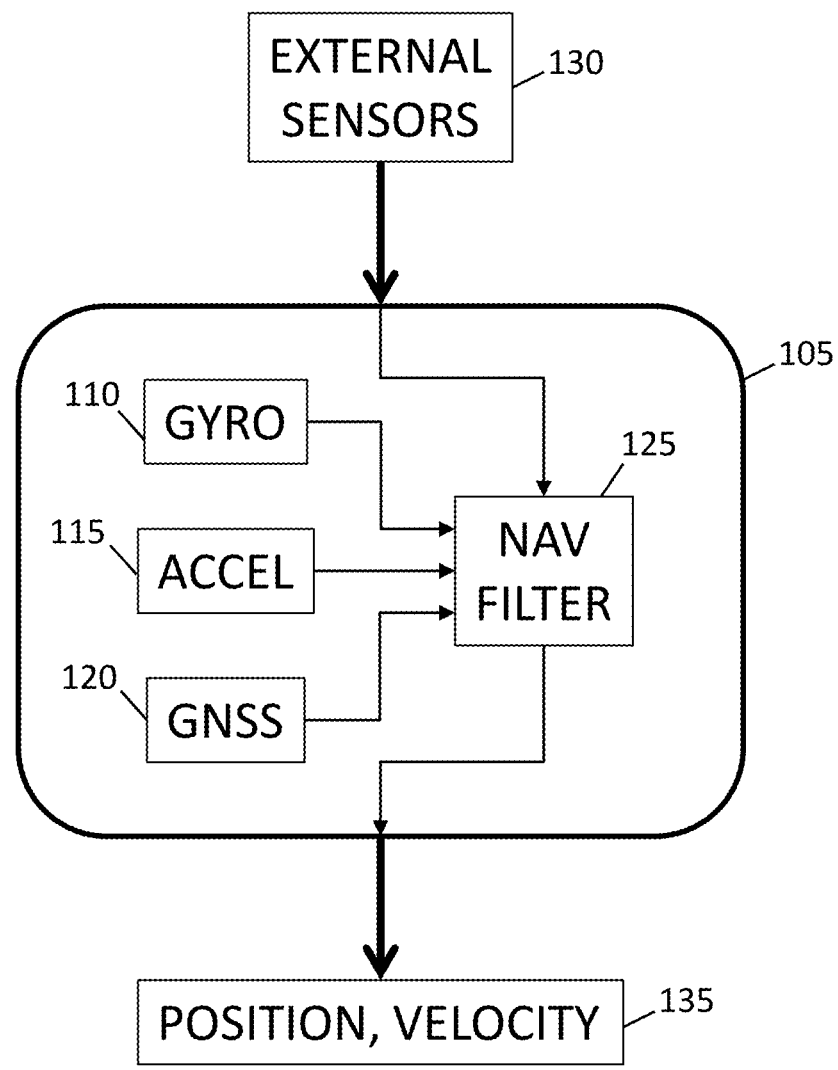
FIG. 1 is a simplified block diagram of a vehicle navigation system.

FIG. 1 is a simplified block diagram of a vehicle navigation system. In FIG. 1, navigation module 105 contains gyroscope 110, optional accelerometer 115, GNSS receiver 120 and navigation filter 125. Module 105 may contain several other components, such as input/output interfaces, that are not shown in FIG. 1. External sensors 130 provide additional input to module 105 and position and velocity estimates 135 are among the module's outputs.

In a typical navigation module, gyroscope 110 is a low-cost MEMS gyroscope. Such gyroscopes usually include an internal temperature sensor. External sensors 130 may include an odometer and a forward/reverse indicator. An odometer may be used by a navigation filter when GNSS data is not available to determine whether or not the navigation module is moving. ("Odometer" includes any indicator of wheel rotation such as a wheel tachometer, speedometer, system for generating wheel ticks, and the like.) Optional accelerometer 115, if included, is a MEMS device. Navigation filter 125 comprises a microprocessor, memory and associated firmware. The navigation filter combines GNSS, gyroscope, accelerometer and external sensor data to produce position and velocity estimates. As an example, a navigation filter may implement a Kalman filter to estimate a state vector that includes position, heading, and sensor biases.

A MEMS gyroscope measures rotation rate around an axis. "Gyroscope" is used throughout to mean a device that measures rate of change of angle with time. Such devices may also be referred to as "rate gyros". Gyroscopes, i.e. rate gyros, may be rotating gyroscopes or vibrating structure gyroscopes, also called Coriolis vibratory gyros. MEMS gyroscopes are Coriolis vibratory gyros, for example.

Figure 2:
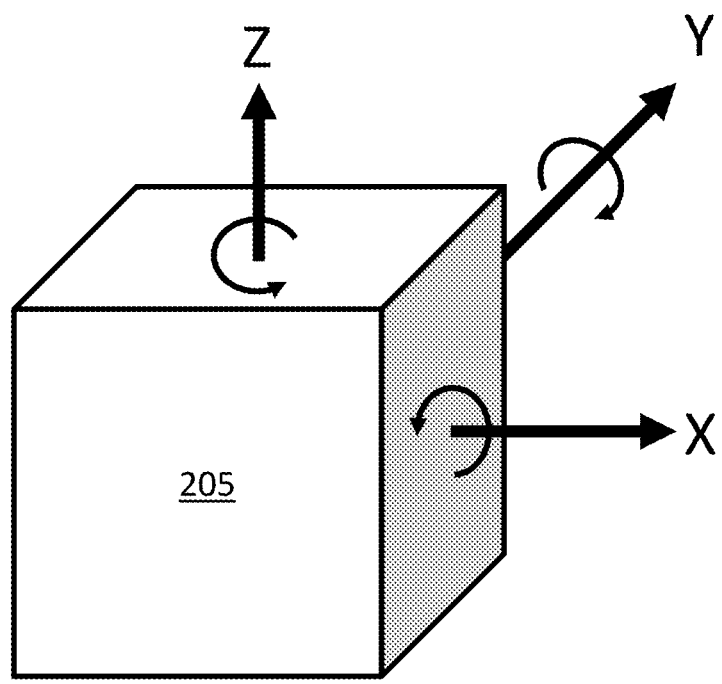
FIG. 2 is a diagram of a MEMS gyroscope module.
Figure 2:
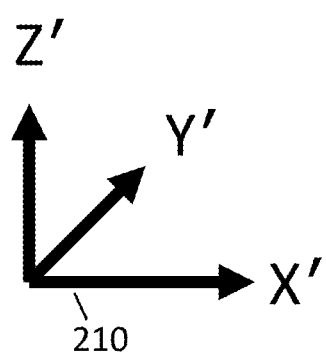

MEMS gyroscopes are often fabricated as a set of three gyroscopes in a module. The three gyroscopes measure rotation rates around three orthogonal axes. FIG. 2 is a diagram of a MEMS gyroscope module. In FIG. 2, gyroscope module 205 measures rotation rate around X, Y and Z axes. The direction of positive rotation is set by convention according to the right hand rule. A gyroscope module may be mounted such that its axes are not aligned with the vehicle's axes. In that case rotation rates measured around the gyroscope module's X, Y and Z axes may be transformed via a rotation matrix into rotation rates around the vehicle's axes provided that the orientation of the gyroscope module with respect to the vehicle is known. Said another way, suppose coordinate system 210 is aligned with a vehicle. Rotation rates around the X', Y' and Z' axes may be found by multiplying a vector of rotation rates around the X, Y and Z axes by a rotation matrix that relates the orientation of the (X, Y, Z) and (X', Y', Z') coordinate systems.

Rotation rate around an axis may be estimated as the product of rotation rate around the axis as measured by a gyroscope minus gyroscope bias, and a scale factor. In symbols:

$$\dot{\theta} = (\dot{\theta}_g - B(T)) \cdot k$$

Here $\dot{\theta}_g$ is rotation rate as measured by a gyroscope. (Dot notation indicates a time derivative:

$$\dot{x} \equiv \frac{dx}{dt}.)$$

B(T) is gyroscope bias. k is a scale factor; k may be a conversion factor that translates gyroscope rotation rate units into degrees per second, for example. $\dot{\theta}$ is the actual rotation rate as estimated from gyroscope measurements considering bias and scale factor. Gyroscope bias B(T) is a function of temperature, T, but may also depend on power on/off events and other sources of drift.

Bias B(T) may be estimated whenever rotation rate can be measured independently of the gyroscope. When a so-called "reference rotation rate", $\dot{\theta}_{ref}$, is available, we have:

$\dot{\theta}_{ref} = (\dot{\theta}_g - B(T)) \cdot k$

B(T) may then be estimated from:

$k \cdot B(T) = k \cdot \dot{\theta}_g - \dot{\theta}_{ref}$

In words, and ignoring scale factor k for a moment, the gyroscope bias is the difference between the rotation rate as measured by the gyroscope and the reference, or actual, rotation rate.

There are several different ways of obtaining a reference rotation rate while a gyroscope is in motion. First, if GNSS velocity information is available, then rotation rates may be inferred from attitude changes. For example if GNSS-velocity-derived heading changes from heading $\theta_1$ at time $t_1$ to heading $\theta_2$ at time $t_2$ then reference heading rate may be estimated as:

$$\dot{\theta}_{ref} = \frac{d\theta}{dt} \cong \frac{\theta_2 - \theta_1}{t_2 - t_1}$$

Alternatively, heading changes (as opposed to heading rate changes) may be compared to time integrated bias and time integrated gyroscope output:

$k \cdot \int_{t_1}^{t_2} B(T) dt = k \cdot \int_{t_1}^{t_2} \dot{\theta}_g dt - (\theta_2 - \theta_1)$ Here the change in heading ($\theta_2 - \theta_1$) from $t_1$ to $t_2$ inferred from GNSS is compared to integrated rotation rate, $k \cdot \int \dot{\theta}_g$ dt, as measured by a gyroscope. The difference is gyroscope bias, integrated over time. Note that it is possible that $\theta_2 = \theta_1$ even if heading is not constant between $t_1$ and $t_2$. Heading might change from north to east and then back to north, for example. Non-zero bias would be revealed by a non-zero value of $k \cdot \int \dot{\theta}_g$ dt in that case. Of course whenever an equation involves a heading change ($\theta_2 - \theta_1$) one must keep track of zero crossings. A heading change from northeast, through north, to northwest is $-\pi/2$, not $+3\pi/2$, for example.

Figure 3:
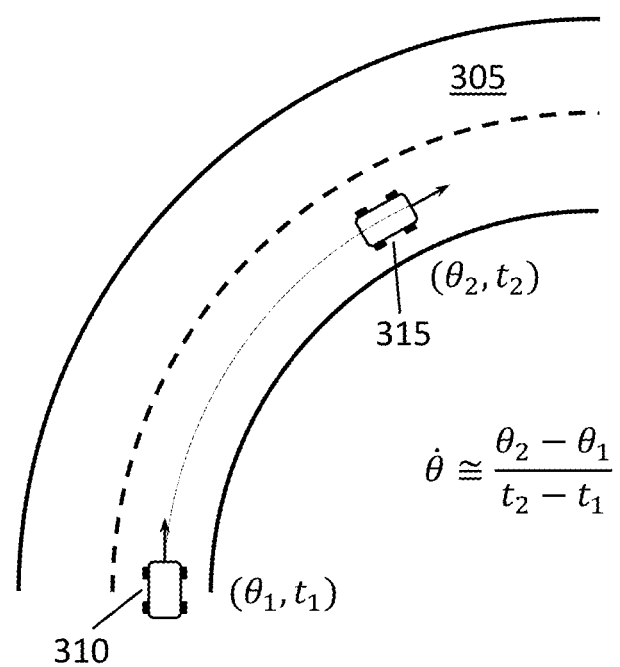
FIG. 3 illustrates obtaining a reference rotation rate with map matching techniques.

As a second example, FIG. 3 illustrates obtaining a reference rotation rate with map matching techniques. FIG. 3 shows a curved road, 305. Consider a vehicle established, via map matching, to be travelling on the road. FIG. 3 shows such a vehicle at two positions as it travels along the road: 310 and 315. At 310 the vehicle's heading is $\theta_1$ at time $t_1$. Later, the vehicle is at 315 with heading $\theta_2$ at time $t_2$. The heading of the vehicle at each position is known from the layout of the road as represented by a map. If the vehicle is moving along a northbound section of the road, for example, then its heading is north. The speed of the vehicle may be estimated from odometer readings. The known curvature of the road combined with the known speed of the vehicle may be used to estimate reference heading rate as, again:

$$\dot{\theta}_{ref} = \frac{d\theta}{dt} \cong \frac{\theta_2 - \theta_1}{t_2 - t_1}$$

The time integrated form discussed above applies in the same way.

A third way to obtain a reference rotation rate is via video navigation. Video of pavement taken from a moving vehicle can be used for dead reckoning navigation and can provide estimates of attitude rate, for example. Most new cars have rearward facing video cameras that could be adapted to obtain video images for this purpose. Determining translational and rotational motion of a video camera from apparent motion of objects in successive video images is often referred to as an "optical flow" technique. Given a heading rate determined from video images, gyro bias may be estimated as described above.

Thus, a reference rotation rate may be obtained from one or more of several sources. When a reference rotation rate is available, gyroscope bias may be estimated in motion. If a gyroscope is not moving, on the other hand, then $\dot{\theta}_{ref} = 0$ and $B(T) = \dot{\theta}_g$. Bias estimates made at a standstill are simple and convenient, but it is not necessarily a good assumption that a vehicle will stop often during a driving trip. Many vehicles are used in nearly the same way every day. A commuter may start driving to work the say way every time he starts his car in the morning, for example. A bus may start from an overnight yard and proceed to its first passenger stop in the same way every day. After engine start, a gyroscope in the car or bus typically warms up (as the engine warms up) until a stable temperature is reached several minutes later. If the vehicle seldom or never stops during the first few minutes of its daily routine, then there may be few opportunities to calibrate B(T) at a standstill for temperatures encountered during the warmup period.

In normal operation, a navigation module in a vehicle updates its estimates for gyroscope bias whenever a reference rotation rate is available. This may include times when the vehicle is turned off and no one is in it. A navigation module may be programmed to wake up periodically, even when a vehicle is not operating, to obtain stationary gyro bias estimates and temperature data.

A vehicle may sustain significant periods of time when an accurate reference rotation rate is not available. Driving in an urban canyon formed by tall buildings or driving through a tunnel are common examples. During these periods bias cannot be estimated from GNSS measurements. Absent map matching, video or other another source of reference rotation rate, if gyroscope temperature changes during one of these periods, then navigation accuracy suffers.

Figure 4:
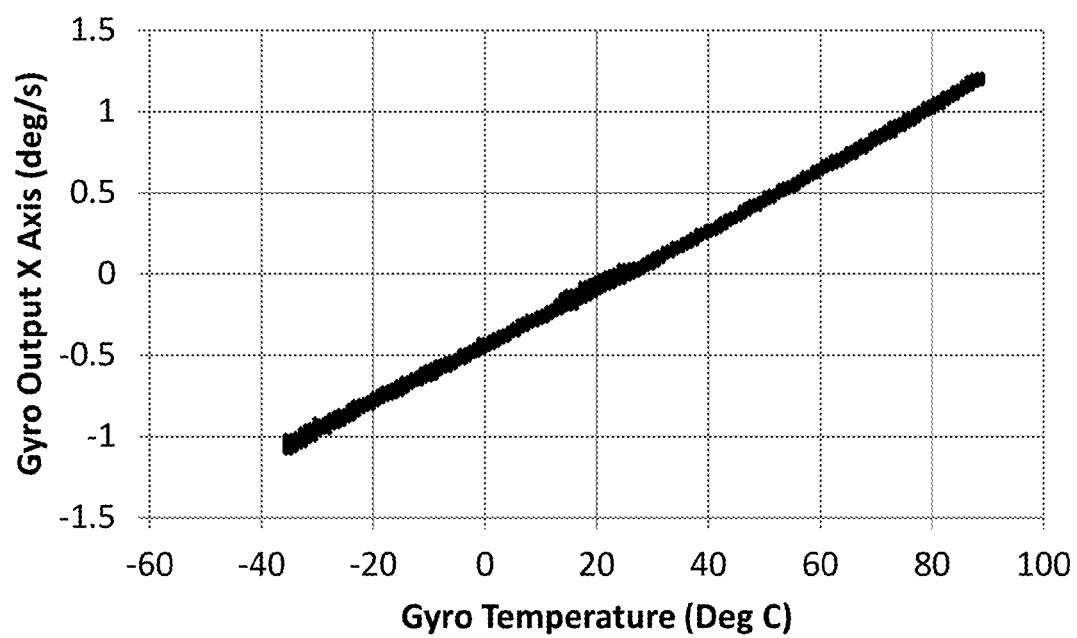
FIG. 4 is a graph of bias versus temperature for a typical X axis gyroscope.
Figure 5:
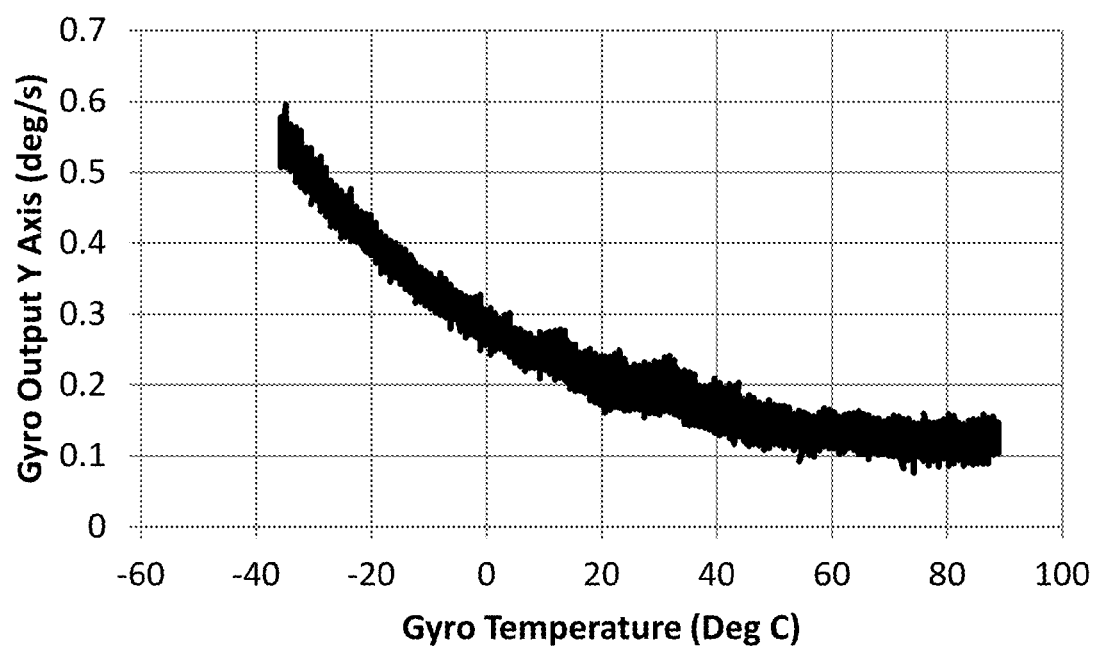
FIG. 5 is a graph of bias versus temperature for a typical Y axis gyroscope.
Figure 6:
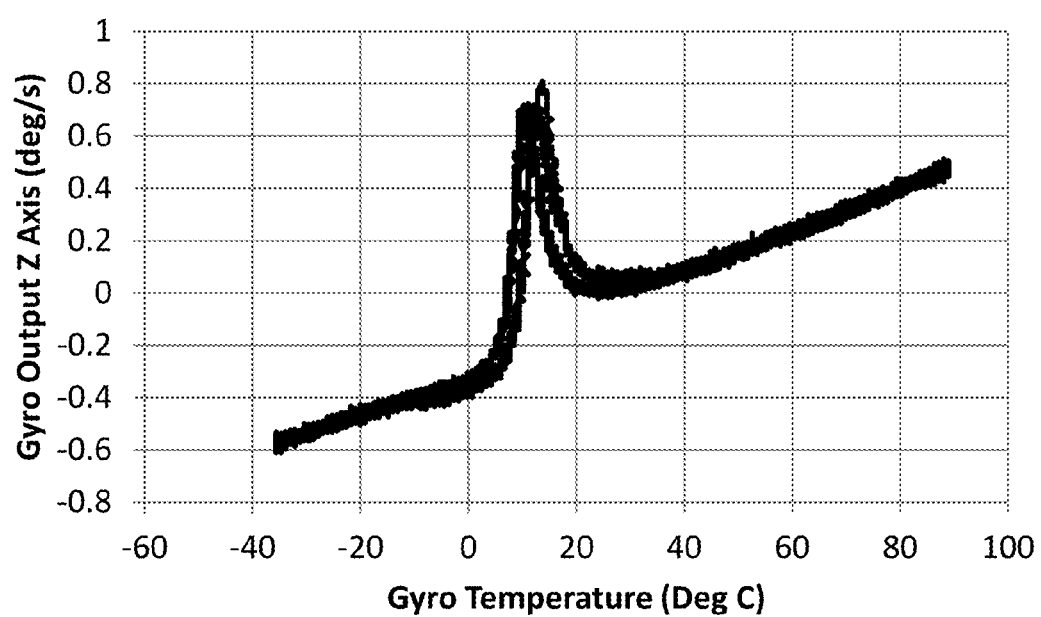
FIG. 6 is a graph of bias versus temperature for a typical Z axis gyroscope.

Although it is well known that gyroscope bias is affected by temperature, low-cost MEMS gyroscopes are not usually shipped with detailed information on the shape of B(T) curves. As examples, FIGS. 4-6 show gyroscope output versus temperature characteristics that were measured in a laboratory for the X, Y and Z axes of a typical MEMS gyroscope. Since the gyroscope was not moving during the test, the output equals the gyroscope bias. The graphs represent data accumulated over three temperature cycles. Each graph shows gyroscope output, $\dot{\theta}_g$, as a function of temperature for one axis.

The graphs of FIGS. 4-6 show that: B(T) is a different function for each gyroscope axis; B(T) may be nonlinear;

and B(T) curves obtained on different temperature cycles have similar shape, but may differ by an offset.

Laboratory measurements of several low-cost MEMS gyroscopes show that a set of gyroscopes, all of the same make and model, each have different bias characteristics. In other words, there is no set of three curves that applies to every three-axis, low-cost, MEMS gyroscope module having a certain part number from a given manufacturer. Each gyroscope module has unique bias characteristics. The bias characteristics of any gyroscope module also tend to differ by a random, constant offset each time the module is turned on.

Figure 7A:
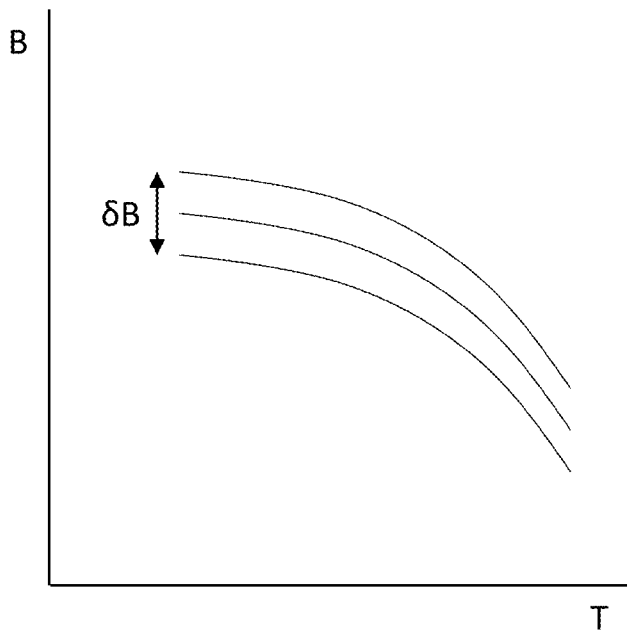
FIGS. 7A and 7B illustrate typical properties of gyroscope bias data.
Figure 7B:
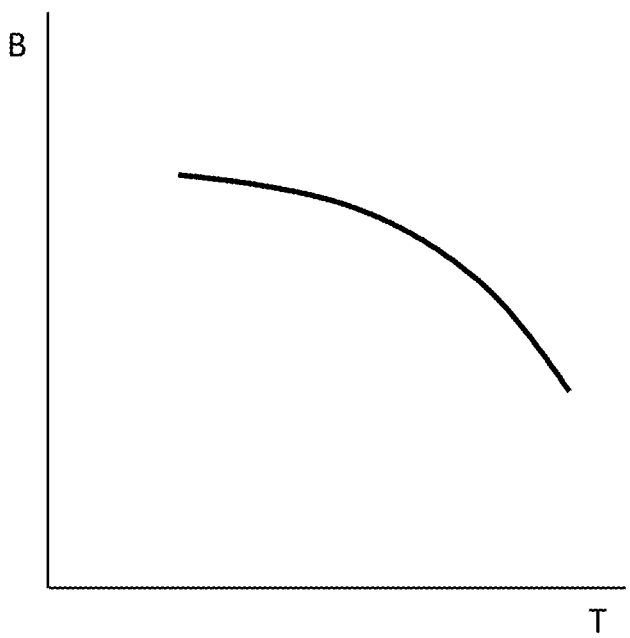

FIGS. 7A and 7B illustrate typical properties of gyroscope bias data. FIG. 7A shows a conceptual graph of bias versus temperature data. (It is not a graph of data measured from an actual gyroscope.) The graph of FIG. 7A show three B(T) curves that are offset from one another. For example, the highest and lowest curves are offset by δB. The curves are representative of bias versus temperature data from different power or temperature cycles of a single gyroscope. FIG. 7A may be compared, for example, with FIG. 5. The thickness of the plot in FIG. 5 is due to run-to-run variations, not short-term noise. In FIG. 5, gyroscope output at 20° C. is shown as varying between approximately 0.18 deg/s and 0.24 deg/s. However if the gyroscope output is monitored continuously at 20° C., it fluctuates far less than that over a period of hours.

Given that gyroscope bias is relatively stable over short time periods, but can vary significantly over long time periods or across power cycles, a simple look up table of bias versus temperature is not sufficient for estimating gyroscope bias at any particular time.

FIG. 7B shows a conceptual graph of average bias versus temperature. The graph of FIG. 7B is the average of the graphs of FIG. 7A. A similar procedure could be applied to the graphs of FIGS. 4-6 or the long-term graph of bias versus temperature data for any gyroscope. A graph such as that of FIG. 7B shows the long-term average value of B for each T. This average includes data from many different power cycles. In one implementation, the average includes data from 40 power cycles.

A graph of average B versus T is useful because it may be used to compute the rate of change of bias versus temperature, $$\left(\frac{dB}{dT}\right).$$

And it turns out that $$\left(\frac{dB}{dT}\right)$$

versus T is approximately the same for each of the curves that was averaged together (for example the curves of FIG. 7A) to find the average B versus T. Thus, given a starting bias value at a particular temperature, one can determine which of the curves of FIG. 7A will apply in the near future.

Figure 8:
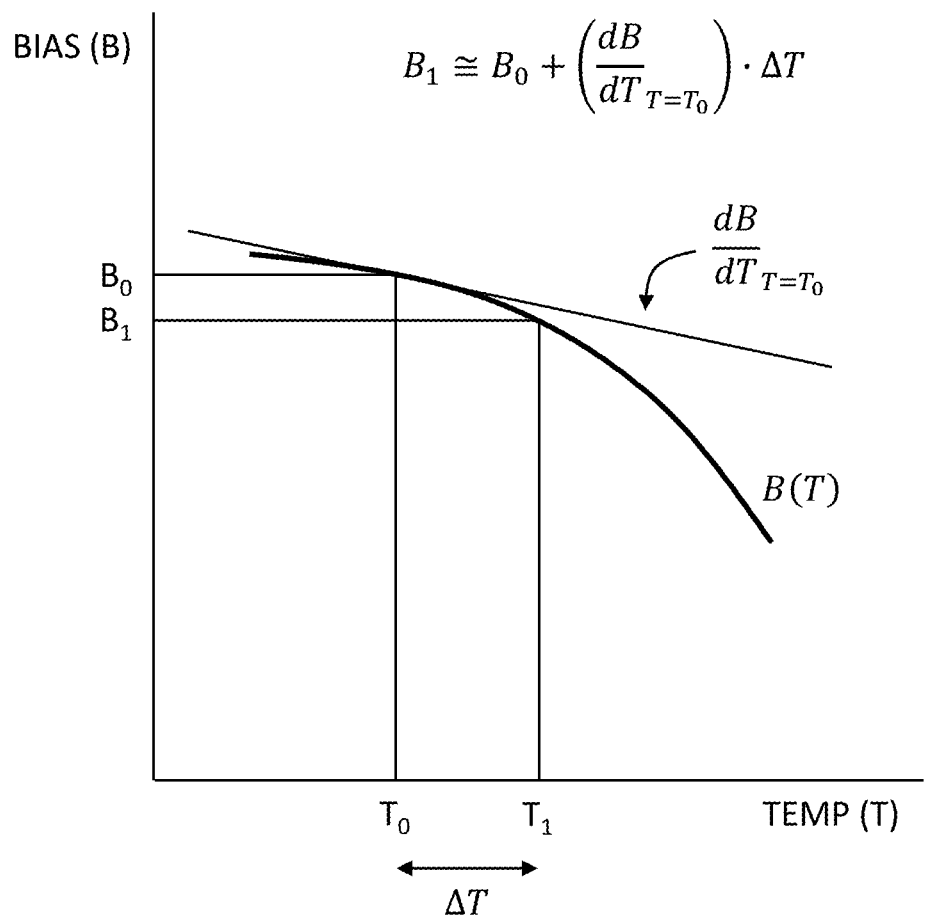
FIG. 8 is a graph illustrating how gyroscope bias may be estimated for temperature $T_1$.

FIG. 8 is a graph illustrating how gyroscope bias may be estimated for temperature $T_1$. Information needed to make the estimate includes bias, $B_0$, measured at an initial temperature $T_0$ and the temperature difference $\Delta T=T_1-T_0$. Also needed is the rate of change of bias with temperature at $T_0$. The bias at temperature $T_1$ may then be estimated via linear extrapolation as:

$$B_1 \cong B_0 + \left(\frac{dB}{dT}\right)_{T=T_0} \cdot \Delta T$$

The following method, performed by a navigation filter such as 125, is useful for estimating bias in low-cost MEMS gyroscopes used in car navigation modules:

(1) Estimate gyroscope bias, and record bias and gyroscope temperature whenever a reference rotation rate is available. From this data, build a table of bias versus temperature.

Step (1) may be performed during normal driving. In addition it may be performed when a car is turned off and parked (e.g. overnight) if its navigation module is programmed to "wake up" periodically when the car is not being driven. A car navigation module may be programmed to turn on periodically whenever electrical power is available even if the car in which the module is installed is not turned on.

(2) Average the bias versus temperature data obtained in step (1) over many driving trips or power cycles. Compute the rate of change of bias versus temperature $$\left(\frac{dB}{dT}\right)$$

from the average bias versus temperature data. Optionally, store rate-of-change-of-bias data in a table.

(3) During a driving trip, if temperature changes occur during periods when a reference rotation rate is not available, then estimate gyroscope bias according to the linear extrapolation:

$$B_1 \cong B_0 + \left(\frac{dB}{dT}\right)_{T=T_0} \cdot \Delta T$$

Here ΔT is the difference between the current temperature and $T_0$.

Bias data may be stored in the memory of a navigation filter. Table 1 provides a conceptual example of a bias table:

TABLE 1

Conceptual example of a bias table.

| T [° C.] | Average Bias B(T) [deg/s] | Bias Variance [(deg/s)$^2$] | Number of Points | $\frac{dB(T)}{dT}\left[\frac{deg/s}{° C.}\right]$ |
|---|---|---|---|---|
| . . . | . . . | . . . | . . . | . . . |
| 20 | 0.10 | 0.035$^2$ | 40 | 0.01 |
| 21 | 0.11 | 0.030$^2$ | 45 | 0.01 |
| . . . | . . . | . . . | . . . | . . . |

In Table 1, the T column contains temperatures in units of [° C.]; the Average Bias B(T) column contains gyroscope biases in units of [deg/s]; the Bias Variance column contains the variance (in units of [(deg/s)$^2$]) of the data used to compute the average bias; the Number of Points column contains the number of bias measurements used to compute the average bias; and the $$\frac{dB(T)}{dT}$$

column contains gyroscope bias rates in units of $$\left[\frac{\text{deg/s}}{°\text{C.}}\right].$$

(Of course other temperature, time and angle units may be used.)

Alternatively, $$\frac{dB(T)}{dT}$$

may be computed from B(T) on an as-needed basis rather than stored in a table. Furthermore, $$\frac{dB(T)}{dT}$$

may be approximated from discrete data points as, for example:

$$\frac{dB}{dT}\bigg|_{T=T_n} \cong \frac{B(T_n) - B(T_{n-1})}{T_n - T_{n-1}}$$

Here, subscript n enumerates discrete temperatures at which average B(T) data exists. Clearly, other discrete approximations for $$\frac{dB(T)}{dT}$$

suffice, such as those involving temperatures a few points farther removed from $T_n$. An approximation for $$\frac{dB}{dT}\bigg|_{T=T_n}$$

may be derived from B(T) at $T_{n-2}$, $T_{n-1}$, $T_n$, $T_{n+1}$, $T_{n+2}$, for example.

The variance of a set of bias measurements may be used as a criterion to decide whether or not to use the average of the measurements when computing $$\frac{dB(T)}{dT}.$$

For example, if the variance of a set of bias measurements made at 21° C. is too large, then the utility of an average bias computed at 21° C. is suspect. A maximum variance may be specified such that if the maximum variance is exceeded for a set of bias measurements at a given temperature, then average bias at that temperature is considered inadequate for use in $$\frac{dB(T)}{dT}$$

computations.

The number of points, i.e. number of bias measurements, used to compute the average bias may be another criterion to decide whether or not to use the average of the measurements when computing $$\frac{dB(T)}{dT}.$$

A minimum number of points may be specified such that average bias is considered inadequate for use in $$\frac{dB(T)}{dT}$$

computations unless at least that number of data points is available. As mentioned above in connection with FIGS. 7A and 7B, B(T) is fairly stable during any particular power cycle, but tends to jump from one power cycle to the next. Therefore, the "Number of Points" tracked in Table 1 may be not merely the number of bias measurements (hundreds of bias measurements may be accumulated during a single driving trip or power cycle), but the number of power cycles during which at least one bias measurement at the particular temperature exists.

It is apparent from FIG. 6 that B(T) may be a nonlinear function. Using the data of FIG. 6, the method described above would not be successful if it were used to estimate B(40° C.) starting from B(10° C.). dB/dT at 10° C. is a large positive number and would lead to a gross overestimate of B(40° C.). In practice, however, such errors do not occur because temperature changes slowly. Bias estimates may be updated periodically and often, for example once per second, and temperature does not change appreciably in such a short time. Thus there is never any need to use a large ΔT. For small ΔT, on the other hand, even a curve like that of FIG. 6 may be locally approximated by a linear function.

Any particular MEMS gyro tends to have a B(T) curve that has an unknown, but repeatable shape, and an unknown offset that changes over long periods or power cycles. Given this behavior, the method described above provides a way to estimate B(T) when a vehicle is moving and accurate GNSS velocity data or other sources of reference rotation rate are not available. The method may be called "adaptive gyroscope bias compensation" since dB/dT versus T may be updated whenever new B(T) data is available. Adaptive gyroscope bias compensation allows a car navigation module to estimate position and velocity reliably during periods of GNSS unavailability even in the presence of temperature changes.

Adaptive gyroscope bias compensation may be extended in various ways. For example, B(T) data may exhibit hysteresis. The bias at a given temperature may depend upon whether that temperature was reached after a period of cooling or after a period of warming. Said another way, bias may depend not just on temperature, but on whether temperature is decreasing or increasing. Hysteresis may be taken into account by computing average biases for both decreasing and increasing temperatures.

Although most of the examples discussed so far involve yaw and reference yaw rates, pitch and roll rates are also valuable for vehicle navigation. Thus reference rotation rate may be estimated from attitude (i.e. pitch, roll and yaw) rates or attitude changes determined from GNSS, map-matching or video, as examples. When attitude change (as opposed to rate) is available, it is compared to integrated gyroscope output and integrated bias as discussed above.

Video and map-matching techniques may be preferred over GNSS as sources for pitch and roll reference rotation rates in some cases. In particular, maps are continually improving and map data with enough accuracy and precision to report road slopes that are useful for gyroscope calibration are now available. When a car starts up a hilly road, for example, map-matching may be used to estimate pitch rate as the slope of road changes. Video may be a useful source of roll rotation rate depending on the field of view of the video source.

When pitch and/or roll are used in navigation, the techniques for estimating B(T) described above may be repeated for each axis of interest. For example, tables like Table 1 may be created for the pitch, roll and yaw axes.

The techniques for estimating gyroscope bias, B(T), described above are useful in vehicle inertial navigation systems. In particular, gyroscope bias estimates may inform a gyroscope bias model when gyroscope bias is an element of a state vector in a Kalman filter.

Figure 9:
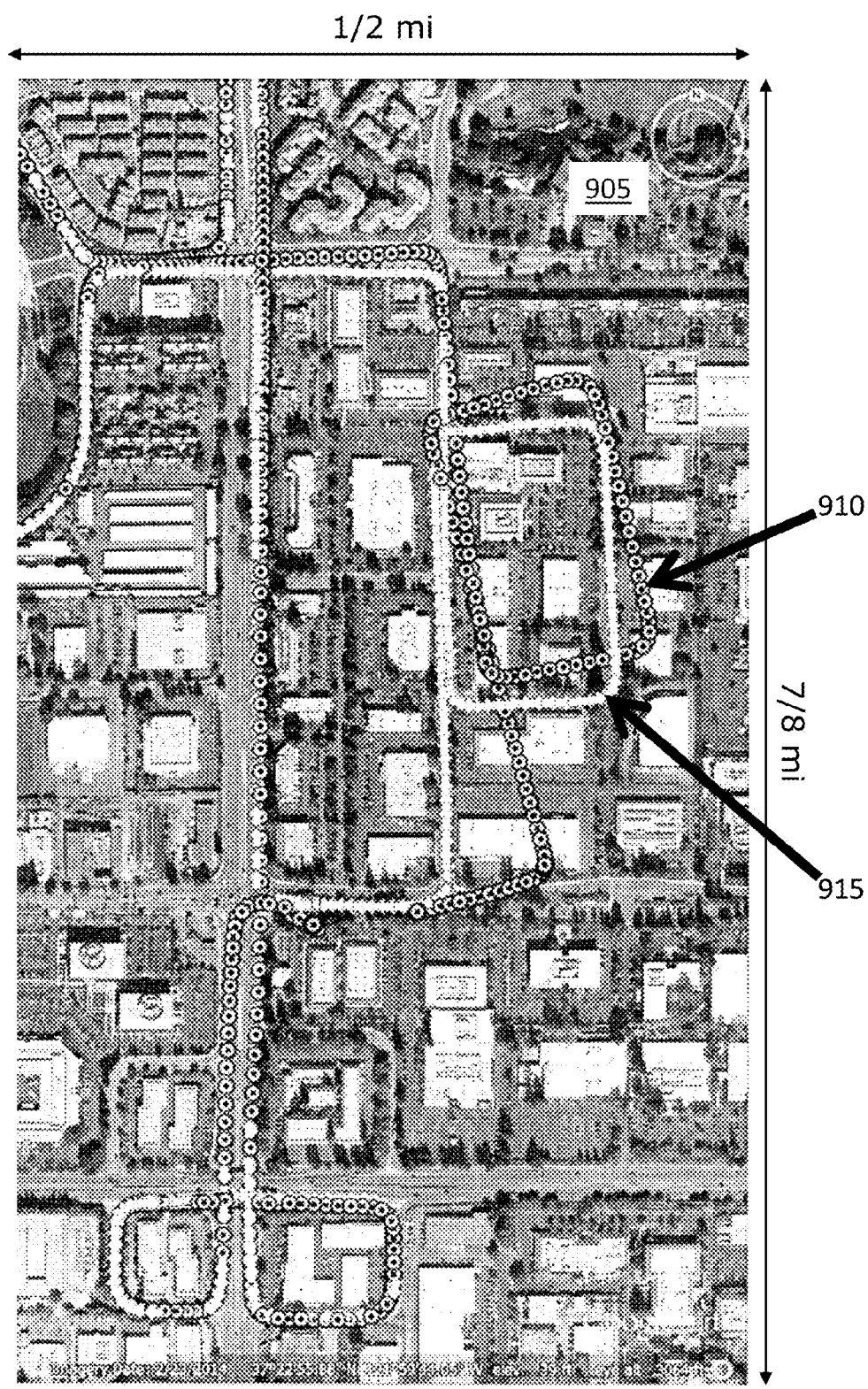
FIG. 9 is a map of experimental data showing that adaptive gyroscope bias compensation improves the accuracy of inertial vehicle navigation.

FIG. 9 is a map of experimental data showing that adaptive gyroscope bias compensation improves the accuracy of inertial vehicle navigation. A series of driving tests were conducted to obtain GNSS, accelerometer and gyroscope data. A bias error, similar in shape to the bias versus temperature curve of FIG. 6, was added to recorded gyroscope data for all times during the tests. Next, data from several driving tests were replayed to allow the adaptive bias compensation methods described above to learn a temperature compensation table similar to Table 1. Finally, a GNSS outage was simulated so that vehicle navigation depended on gyroscope performance. FIG. 9 shows results with and without the benefit of adaptive bias compensation. In FIG. 9, map 905 covers city streets in an area about ½ mile wide by ⅞ mile long. White circles with black dots 910 indicate position fixes obtained without adaptive gyroscope bias compensation. White arrows 915 indicate position fixes obtained with adaptive gyroscope bias compensation. It is clear from the experimental data that adaptive gyroscope bias compensation improves the accuracy of vehicle navigation.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for improving the accuracy of a vehicle navigation module including a gyroscope and a navigation filter, the method comprising:
storing average gyroscope biases as a function of temperature, the average gyroscope biases as a function of temperature obtained by averaging gyroscope biases over a plurality of temperature cycles;
computing gradients of gyroscope bias as a function of temperature from the average gyroscope biases as a function of temperature;
estimating a gyroscope bias at a first temperature based on a reference rotation rate when the reference rotation rate is available by: (i) measuring a rotation rate at the first temperature using the gyroscope, and (iii) comparing the measured rotation rate with the reference rotation rate; and,
estimating a gyroscope bias at the first temperature, when no reference rotation rate is available, via linear extrapolation from a known bias value at a second temperature, the linear extrapolation taking into account a difference between the first temperature and the second temperature and a gradient of gyroscope bias at the second temperature from the computed gradients of gyroscope bias.

2. The method of claim 1 further comprising storing the computed gradients of gyroscope bias as a function of temperature.

3. The method of claim 1 further comprising:
updating the average gyroscope biases as a function of temperature using the estimated gyroscope bias at the first temperature based on the reference rotation rate.

4. The method of claim 1 wherein computing gradients of gyroscope bias comprises:
excluding average gyroscope biases for which a number of gyroscope biases used to compute the average gyroscope biases is less than a specified minimum number of gyroscope biases.

5. The method of claim 1 wherein computing gradients of gyroscope bias comprises:
excluding average gyroscope biases for which a variance of gyroscope biases used to compute the average gyroscope biases is greater than a specified maximum variance.

6. The method of claim 1, wherein the reference rotation rate is estimated from attitude rates or changes determined from GNSS velocity data.

7. The method of claim 1, wherein the reference rotation rate is estimated from attitude rates or changes determined by map-matching techniques.

8. The method of claim 1, wherein the reference rotation rate is estimated from attitude rates or changes determined from video data.

9. The method of claim 1, wherein estimating gyroscope bias at the first temperature based on a reference rotation rate is performed when the gyroscope is stationary and the reference rotation rate is zero.

10. The method of claim 1, wherein the navigation module is installed in a vehicle, and the method is performed regardless of whether the vehicle is turned on or off.

11. The method of claim 1, wherein the navigation module is installed in a vehicle and is programmed to be turned on periodically whenever electrical power is available even if the vehicle is not turned on.

12. A vehicle navigation module comprising:
a MEMS gyroscope; and,
a navigation filter configured to:
store average gyroscope biases as a function of temperature, the average gyroscope biases as a function of temperature obtained by averaging gyroscope biases over a plurality of temperature cycles;

compute gradients of gyroscope bias as a function of temperature from the average gyroscope biases as a function of temperature;

estimate a gyroscope bias at a first temperature based on a reference rotation rate when the reference rotation rate is available by: (i) measuring a rotation rate at the first temperature using the gyroscope, and (iii) comparing the measured rotation rate with the reference rotation rate; and, estimate a gyroscope bias, when no reference rotation rate is available, via linear extrapolation from a known bias value at a second temperature, the linear extrapolation taking into account a difference between the first temperature and the second temperature and a gradient of gyroscope bias at the second temperature from the computed gradients of gyroscope bias.

13. The vehicle navigation module of claim 12, wherein the navigation filter is further configured to store the computed gradients of gyroscope bias.

14. The vehicle navigation module of claim 12, wherein the navigation filter is further configured to update the average gyroscope biases as a function of temperature using the estimated gyroscope bias at the first temperature based on the reference rotation rate.

15. The vehicle navigation module of claim 12, wherein the navigation filter is further configured to exclude average gyroscope biases for which a number of gyroscope biases used to compute the average gyroscope biases is less than a specified minimum number of gyroscope biases.

16. The vehicle navigation module of claim 12, wherein the navigation filter is further configured to exclude average gyroscope biases for which a variance of gyroscope biases used to compute the average gyroscope biases is greater than a specified maximum variance.

17. The vehicle navigation module of claim 12, wherein the reference rotation rate is estimated from attitude rates or changes determined from GNSS velocity data.

18. The vehicle navigation module of claim 12, wherein the reference rotation rate is estimated from attitude rates or changes determined by map-matching techniques.

19. The vehicle navigation module of claim 12, wherein the reference rotation rate is estimated from attitude rates or changes determined from video data.

20. The vehicle navigation module of claim 12, wherein the navigation filter is configured to estimate the gyroscope bias at the first temperature based on the reference rotation rate when the gyroscope is stationary and the reference rotation rate is zero.

* * * * *